United States Patent [19]

Merriweather et al.

[11] 3,858,000

[45] Dec. 31, 1974

[54] EXTENDED RANGE AFC SYSTEM

[75] Inventors: Kenneth A. Merriweather, Evanston; Harold J. Benzuly, Highland Park, both of Ill.

[73] Assignee: Warwick Electronics, Inc., Chicago, Ill.

[22] Filed: Dec. 4, 1972

[21] Appl. No.: 312,081

[52] U.S. Cl. .......... 178/5.8 AF, 325/418

[51] Int. Cl. .......... HO4n 7/06

[58] Field of Search .......... 178/5.8 A, 5.8 AF, 5.8 R; 325/346, 418–423; 178/7.3 R, 7.5 R

[56] References Cited

UNITED STATES PATENTS

| | | | |
|---|---|---|---|
| 2,664,464 | 12/1953 | Cotsworth | 325/422 |
| 2,714,132 | 7/1955 | Fredendall | 178/5.8 AF |
| 2,790,848 | 4/1957 | Koch | 178/5.8 AF |
| 2,891,105 | 6/1959 | Keizer | 178/5.8 AF |
| 3,388,215 | 6/1968 | Mayle | 178/5.8 R |
| 3,447,084 | 5/1969 | Haner et al. | 325/421 |
| 3,624,512 | 11/1971 | Evans | 178/5.8 AF |

OTHER PUBLICATIONS

"Automatic Freq. Control" By Lavender in the RCA Technical Notes No. 348 Nov. 1959. system for 625-line TV receivers" by Bissmire in Mullard Technical Communications "Simple AFC System for 625–Line TV Receivers" by Bissmine in Mullard Technical Communications, Vol. 104, March 1970.

*Primary Examiner*—Benedict V. Safourek
*Assistant Examiner*—Jin F. Ng
*Attorney, Agent, or Firm*—Wegner, Stellman, McCord, Wiles & Wood

[57] ABSTRACT

In a television receiver, an automatic frequency control has a pull-in range extending from 3 megahertz below to 1 megahertz above the desired video carrier intermediate frequency. The upper pull-in range is effectively extended when a logic circuit detects the absence of horizontal sync pulses and the presence of the co-channel sound carrier in the lower pull-in range, as indicated by a predetermined automatic frequency control voltage. The logic circuit is disabled when the video carrier intermediate frequency is pulled to within the normal pull-in range of the automatic frequency control.

12 Claims, 4 Drawing Figures

| PICTURE OR VIDEO CARRIER AT | SYNC. DET OUTPUT | AFC BUFFER OUTPUT | LOGIC CIRCUIT OUTPUT |
|---|---|---|---|
| A | 0 | 1 | 0 |
| B | 0 | 0 | 0 |
| C | 0 | 0 | 0 |
| D | 1 | 1 | 1 |

EXTENDED RANGE AFC SYSTEM

BACKGROUND OF THE INVENTION

This invention relates to an extended range automatic frequency control for a television receiver.

In color television receivers which use a detented VHF tuner and a continuously adjustable UHF tuner, it has not been necessary for the automatic frequency control (AFC) system to have a pull-in range of greater than ± 1.0 megahertz. This is possible since the infinitely variable fine tuning control for the RF oscillator of the UHF tuner will bring the intermediate frequency (IF) of the video carrier within ± 1 megahertz of the desired IF video carrier frequency, typically 45.75 megahertz. Detented VHF tuners have been capable, on a production basis, of a detented RF oscillator setting which brings the IF video carrier frequency to within ± 1 megahertz of its desired frequency.

With the advent of detented UHF tuners, tuner manufacturers have been unable to hold the tolerances such that the detented RF oscillator frequency of the UHF tuner is consistently within ± 1 megahertz of the desired frequency. It appears that the best tolerance which can be obtained in the immediate future on a production basis is approximately ± 3 megahertz. Thus, any AFC system used in conjunction with such tuners must have a wide band pull-in ability.

Unfortunately, it is not practical to simply alter the bandwidth of conventional AFC systems to provide a pull-in range of ± 3 megahertz. If the AFC pull-in frequency is extended downwardly to − 3 megahertz, the AFC system may lock on the co-channel sound carrier when the RF oscillator is de-tuned ± 1.5 megahertz or more, rather than on the desired video carrier. In extending the pull-in range upwardly to + 3 megahertz, the bandwidth would extend beyond the adjacent channel sound trap, which removes frequencies near 47.25 megahertz in order to prevent interference from the adjacent channel sound carrier. This would result in no AFC pull-in capability for these IF frequencies. Thus, merely extending the pull-in range of a conventional AFC system does not accomplish the desired result of pulling in the selected video carrier to its desired intermediate frequency in a predetermined manner for ± 3.0 megahertz tuning errors.

SUMMARY OF THE INVENTION

In accordance with the present invention, a unique AFC system effectively extends the AFC pull-in range to ± 3 megahertz, while preventing undesirable locking onto an incorrect carrier. This is accomplished by using a novel logic circuit which determines that the intermediate frequency of the desired video carrier has moved between + 1 and + 3 megahertz higher than the desired value of 45.75 megahertz by sensing the presence of the intermediate frequency of the co-channel sound carrier in the range 0 to − 3 megahertz below the desired video carrier frequency and the absence of horizontal sync pulses. An artificial bias voltage is then produced to cause the IF video carrier to move to a lower frequency which is within the normal capture range of the AFC system. The artificial bias is opposite to the bias which would otherwise be produced by the AFC system during this condition. The presence of the IF co-channel sound carrier below the desired IF video carrier frequency is detected by sensing a predetermined level of AFC voltage.

The AFC system with the novel logic circuit can be added onto present AFC systems, permitting their use with detented UHF tuners having tolerance limits of ± 3 megahertz. The modified AFC system described herein offers an added benefit in that it cannot lock out of the ± 3 megahertz range because the system is designed to hunt during channel changes or when the television receiver is tuned to a blank channel.

One object of the present invention is the provision in a television receiver of an improved AFC system having an extended pull-in range for capturing a selected video carrier whose intermediate frequency has deviated in a range of ± 3 megahertz from a desired value.

Another object of this invention is the provision in a television receiver of an improved AFC system which modifies its operation when it senses the absence of horizontal sync pulses and the simultaneous presence of an AFC voltage which indicates the presence of the IF co-channel sound carrier within the lower IF bandpass.

Other features and advantages of the invention will be apparent from the following description, and from the drawings. While an illustrative embodiment of the invention is shown in the drawings and will be described herein, it should be understood that the present disclosure is to be considered as an exemplification of the principles of the invention and is not intended to limit the invention to the embodiment illustrated.

DESCRIPTION OF THE PREFERRED EMBODIMENT

Figure 1:
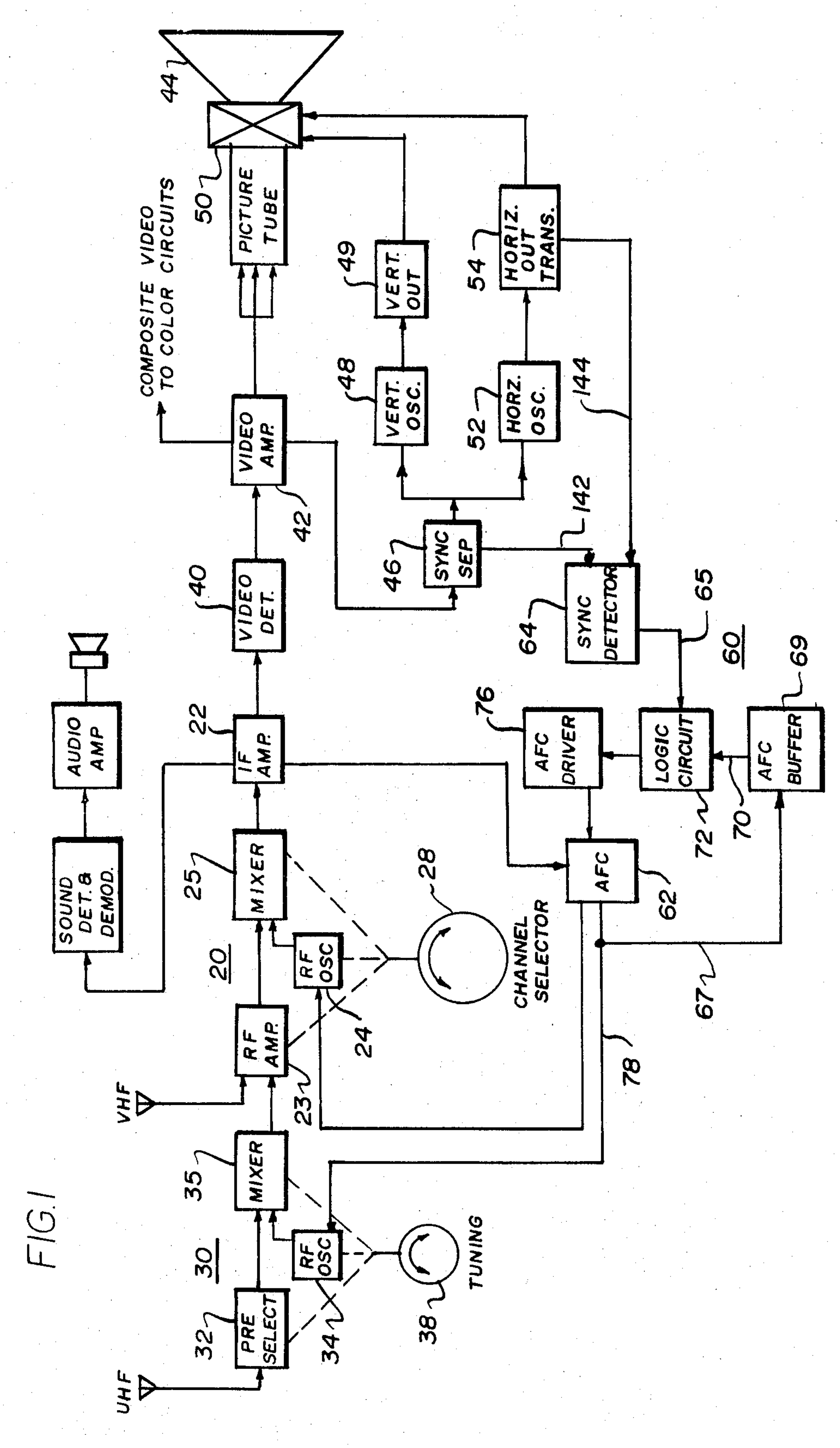
FIG. 1 is a block diagram of a television receiver incorporating the applicants' extended range AFC system.

Referring to FIG. 1, a television receiver includes a VHF tuner 20 designed to select a desired VHF composite television signal and convert it to an intermediate frequency (IF) signal which is amplified by an IF amplifier stage 22. The VHF tuner 20 includes an RF amplifier 23, an RF or local oscillator 24, and a mixer 25, all mechanically linked for simultaneous tuning by a channel selector 28. When properly adjusted, the RF oscillator 24 produces a sine wave output that is always a fixed frequency, such as 45.75 megahertz, higher than the video carrier frequency of the desired station. The channel selector 28, which is typically detented for each VHF channel, can preset oscillator 24 such that the video IF carrier will be within ± 1 megahertz of the desired value.

For receiving a UHF channel, a UHF tuner 30 provides an output to the VHF tuner 20 for coupling to the IF stage 22 in a known manner. UHF tuner 30 consists of a preselector 32, and RF or local oscillator 34, and a mixer 35 which are simultaneously tuned by means of a tuning mechanism 38. UHF tuning may be a continuous operation, or may comprise a mechanically or electrically detented operation. The RF oscillator 34 operates with the same offset frequency as the RF oscillator 24, such as 45.75 megahertz, to produce the same intermediate frequency output from the mixer 35. Since a UHF tuner typically does not provide signal gain, its output may be amplified by utilizing various sections of the VHF tuner 20 as additional stages of IF amplification.

The IF signal from the IF amplifier 22 consists of an AM modulated video carrier with synchronizing components and an FM modulated audio carrier. The signal may also include a chrominance component in the case of a color television receiver. The IF video carrier is detected by a video detector 40 and is amplified in a video amplifier stage 42 before being coupled to a television picture tube 44. A sync separator 46, coupled to the video amplifier 42, separates the synchronizing or sync pulses from the composite video signal. The vertical sync information controls a vertical oscillator 48 and a vertical output circuit 49 which provide vertical scan signals to a deflection coil 50 associated with the picture tube 44. Horizontal sync pulses from the sync separator 46 control a horizontal oscillator 52 and a horizontal output transformer 54 for providing horizontal scanning signals to the deflection coil 50.

Figures 3, 4:
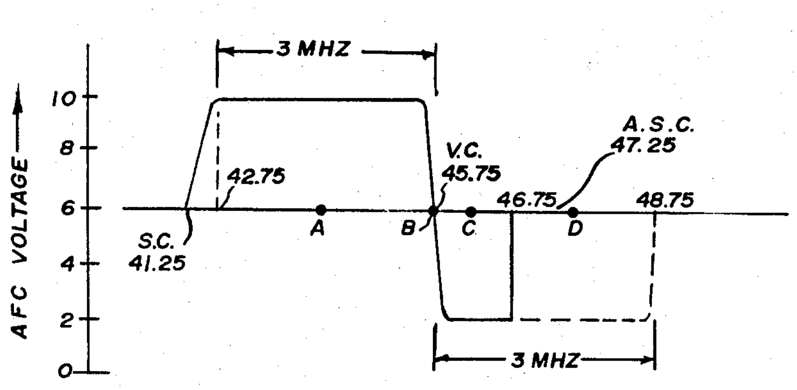
FIG. 3 is a curve of the frequency response of the extended range AFC system.
FIG. 4 is a truth table of the logic circuit shown in FIG. 2.

In accordance with the present invention, an extended range AFC system 60 provides a DC tuning correction voltage to RF oscillators 24 and 34 in order to maintain the IF video carrier at its desired frequency value of 45.75 megahertz. An otherwise conventional AFC stage 62 is modified as will be described, so as to extend its lower bandpass. As seen in FIG. 3, the response curve of the AFC stage 62 is modified so that it extends 3 megahertz below the desired 45.75 megahertz IF video carrier frequency and 1 megahertz thereabove, as shown in solid lines. When the IF video carrier (V.C.) is at its desired frequency of 45.75 megahertz, then the co-channel sound carrier (S.C.) is located at 41.25 megahertz, and the adjacent channel sound carrier (A.S.C.) is located at 47.25 megahertz, both points being outside AFC bandpass.

If the UHF tuner is detuned to cause the IF video carrier V.C. to be located between 46.75 megahertz and 48.75 megahertz, the AFC system 60 detects this condition and effectively extends the upper bandpass by an additional 2 megahertz, as shown by dashed lines. This is accomplished as follows. When the video carrier V.C. is so located between 46.75 to 48.75 megahertz, it falls in the vicinity of the adjacent channel sound trap, and the output of the video detector 40 of FIG. 1 is significantly attenuated. As a result, the sync separator 46 no longer provides sync pulses to the horizontal and vertical scanning sections of the television receiver.

In AFC system 60, a sync detector 64 is responsive to the absence of horizontal sync pulses and produces a logic 1 bit output on a line 65. At this same time, the co-channel sound carrier S.C. is located in the lower pull-in range of the AFC stage 62, causing it to produce a more positive AFC voltage on a line 67. This voltage is coupled to an AFC buffer 69 and produces a logic 1 bit on line 70. In response to activating 1 bits on both input lines 65 and 70, a logic circuit 72 generates an artificial AFC correction voltage, which is coupled through an AFC driver 76 to the AFC stage 62. The artificial AFC correction voltage causes AFC stage 62 to lower its output AFC voltage on a line 78. This causes the RF oscillator 34 to retune in a direction which pulls the video carrier V.C. lower towards it proper value of 45.75 megahertz.

When the video carrier V.C. returns to within + 1 megahertz of 45.75 megahertz, synchronizing pulses are again produced by the sync separator 46. As a result, the logic circuit 72 deactivates the extended range operation of the AFC system. Since the video carrier, which is significantly stronger than the co-channel sound carrier, is now located within the bandpass of the AFC stage 62, the stage is effective in a known manner to return the video carrier to 45.75 megahertz.

Figure 2:
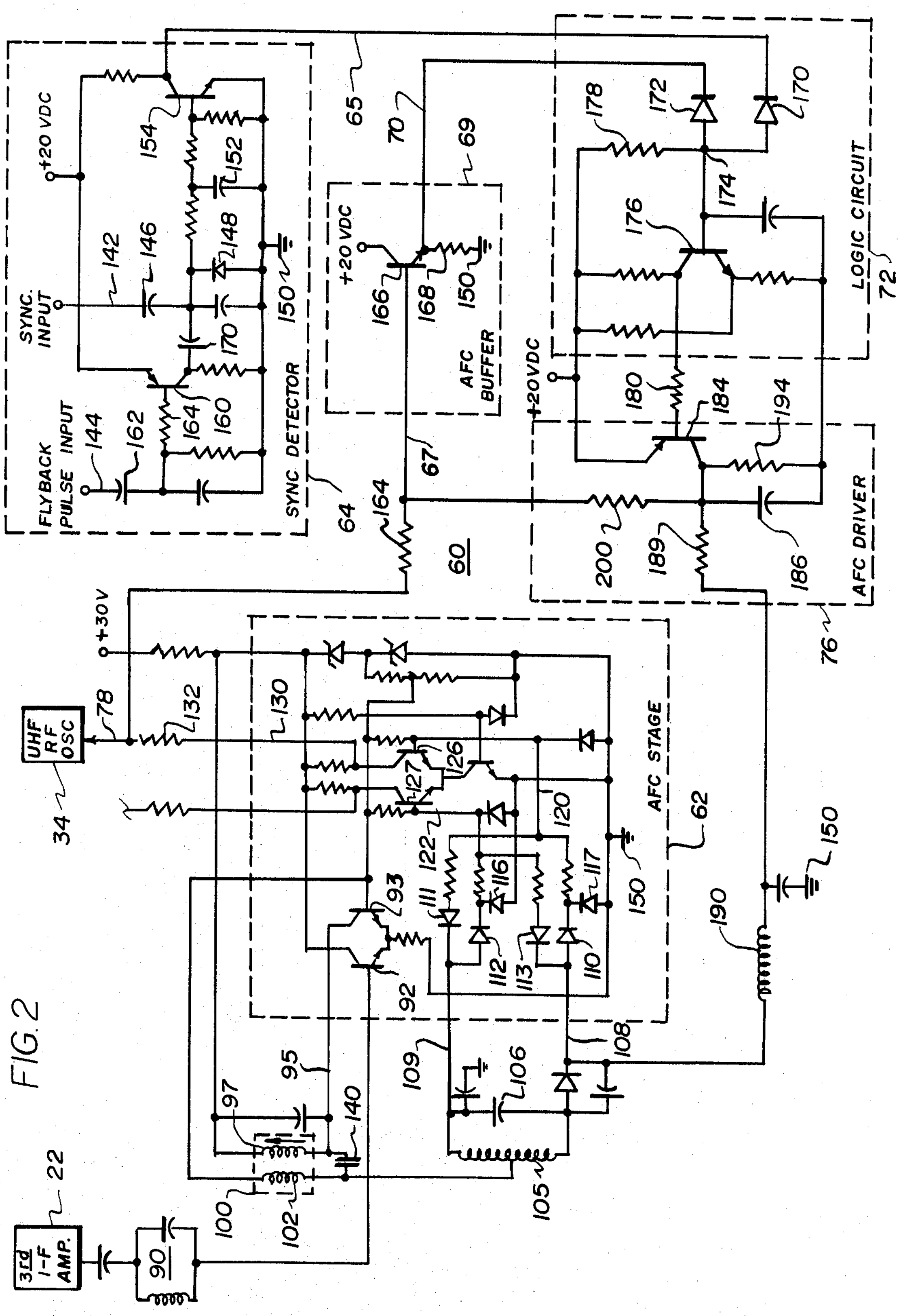
FIG. 2 is a schematic diagram of the extended range AFC system as shown in block diagram form in FIG. 1.

In FIG. 2, a schematic of the extended range AFC system 60 is given in detail. The last stage of IF amplifier 22 is coupled through a capacitor to a parallel resonant trap circuit 90 which filters out the IF adjacent channel sound carrier at 47.25 megahertz. The filtered IF signal then passes to a conventional AFC stage 62 which may be formed by a single integrated circuit, such as an RCA integrated circuit CA3044IV. The operation of such a stage is well-known, and will only be briefly described insofar as necessary for a general understanding of the present invention.

The IF signal passes to the base of a transistor 92 which forms with a transistor 93 a differential amplifier operating as a 45 megahertz limiter-amplifier. This amplifier supplies a peak-to-peak output current of approximately 4 milliamperes for input levels above a predetermined threshold. The amplified and limited output signal from transistor 93 is coupled through a line 95 to the primary winding 97 of a phase detecting transformer 100. The signal appearing in a secondary winding 102 of transformer 100 is coupled to the center tap of a second phase detecting transformer 105. The phase detecting transformer 105 forms a resonant circuit with a capacitor 106, and functions as a center-tuned discriminator generally known as a phase shift or Foster-Seeley discriminator. If the IF frequency supplied to the center tap of phase detecting transformer 105 is above 45.75 megahertz, the signal at an input line 108 exceeds the signal at an input line 109.

Input lines 108 and 109 feed a full wave bridge consisting of diodes 110, 111, 112 and 113. A pair of diodes 116 and 117 are used as filter capacitors within the integrated circuit chip which forms stage 62. If the input signal at input line 108 exceeds that at input line 109, the charge buildup across filter diode 117 exceeds that built up across filter diode 116. This causes the signal on a line 120 to exceed that on a line 122. The signal on line 120 is applied to the base of a transistor 126, connected to form a differential amplifier with a transistor 127. As transistor 126 increases in current conduction and the current level in transistor 127 correspondingly decreases, the DC level on a line 130 decreases below its nominal value of + 6.0 volts. The + 6.0 volt level corresponds to the reference level of the response curve in FIG. 3.

The below + 6.0 volt signal is coupled through a resistor 132 to input line 78 for the UHF RF oscillator 34. The frequency of oscillator 34 changes such as to lower the frequency of the IF video carrier V.C. towards 45.75 megahertz. In a similar manner, if the frequency coupled to transistor 92 drops below the desired value of 45.75 megahertz, the circuit causes the voltage on line 130 to increase above the nominal + 6.0 volt level, causing UHF RF oscillator 34 to change its frequency in a manner to raise the frequency of the IF video carrier.

AFC stage 62 and the pair of phase detecting transformers 100 and 105 are conventional, and are typically utilized to produce a correction signal for frequency deviations of ± 1.0 megahertz. In order to widen the lower bandwidth from 1 megahertz to 3.0 megahertz below 45.75 megahertz, a capacitor 140 is added to effectuate capacitive coupling between the primary 97 and the secondary 102 of phase detecting transformer 100. With an appropriate capacitive value, this allows the bandwidth to extend to − 3 megahertz.

The remaining circuitry of FIG. 2 allows the bandwidth to be selectively extended to + 3.0 megahertz when the intermediate frequency of the video carrier V.C. lies within the bandpass shown by dashed lines in FIG. 3. If UHF RF oscillator 34 is detuned so that the IF video carrier lies between 46.75 megahertz and 48.75 megahertz, horizontal sync pulses cease to be generated. Sync detector 64 includes an input 142 from the sync separator 46 and a second input 144 from the horizontal output transformer 54. The operation of sync detector 64 is disclosed in a copending application of Kenneth A. Merriweather, one of the applicants herein, Ser. No. 312,082, entitled "Control Circuit for AFC System," filed concurrently with the present application, and assigned to the same assignee as the present application. The general operation of the sync detector will be described herein, sufficient for purposes of understanding the present invention, but the above noted patent application should be referred to for a detailed explanation of sync detector 64.

Briefly negative going sync pulses on line 142 pass through a capacitor 146 and a diode 148 to a source of reference potential or ground 150. When the sync pulse disappears, line 142 is raised just above ground potential, causing capacitor 146 to discharge such that a capacitor 152 is charged to approximately + 8 volts DC. This forwardly biases a transistor 154, causing its collector to be held to approximately ground potential, and hence causing connected line 65 to be held to approximately ground potential, i.e., a logic 0 bit. When a predetermined plurality of negative going horizontal sync pulses are no longer coupled to line 142, the charge across capacitor 152 dissipates after a time period corresponding to the time constant of the RC network including capacitor 152, which is approximately 1 horizontal frame. As a result, the forward bias potential for transistor 154 is dissipated, and thr transistor is turned off, causing its collector and hence line 65 to rise in potential towards B+, thus producing a logical 1 bit output on line 65. The operation of the time constant network insures that a temporary loss of a few sync pulses, as may be masked by noise, does not trigger operation of the extended range AFC system.

For noise immunity, a transistor 160 renders the sync detector 64 active only during the time period when horizontal sync pulses should be present, namely, during the time of retrace or flyback pulses from the horizontal output transformer. Positive going flyback pulses are coupled via a line 144 and through a capacitor 162 and a resistor 164 to the base of transistor 160, rendering it non-conductive. As a result, the transistor has no effect on the negative going sync pulses which are allowed to pass through capacitor 146 for subsequent charging of capacitor 152. However, in the absence of retrace pulses, the transistor 160 is forward biased, thereby AC coupling the junction of capacitor 146 and diode 148 to AC ground via a capacitor 170, the conducting collector-emitter junctions of transistor 160, and through the + 20 volt DC source to reference ground. Thus, any noise spikes on line 142 are shunted to reference ground by means of the conducting transistor 160.

The AFC buffer 69 has a logical 1 bit output on line 70 when the co-channel sound carrier is located in the 3 megahertz bandpass below the desired IF video carrier frequency of 45.75 megahertz. Referring to FIG. 3, it should be noted that if the IF video carrier V.C. is located between 46.75 megahertz, the co-channel IF sound carrier S.C. is located in a range between 43.75 and 45.75 megahertz. Returning to FIG. 2, the presence of the sound carrier S.C. in the lower IF bandpass causes AFC stage 62 to produce an AFC voltage output on line 78 of approximately + 10 volts. This voltage is fed via a resistor 164 to the base of a transistor 166 in AFC buffer 69. Transistor 166 is now forward biased, causing a large positive potential to be developed across an emitter resistor 168. This positive voltage is applied via line 70 to the logic circuit 72, and represents a logical 1 bit.

In summary, when there is an absence of horizontal sync pulses, and a + 10 volt AFC voltage due to detection of the sound carrier S.C. below 45.75 megahertz, both lines 65 and 70 carry logical 1 bits as indicated by positive voltages. In logic circuit 72, the lines 65 and 70 are coupled to diodes 170 and 172, respectively. The diodes have their anodes coupled to a common junction point 174 which is connected to the base of a transistor 176. The junction 174 is also coupled through a resistor 178 to a positive supply, such as + 20 volts DC. The logic circuit 72 forms a logical AND gate which produces an output only when logical 1 states are both simultaneously present on lines 65 and 70.

When this occurs, both diodes 170 and 172 are back biased, causing transistor 176 to be forward biased and thus dropping the potential at its collector electrode. The collector electrode is coupled through a resistor 180 to a transistor 184 in the AFC driver 76. The conduction of transistor 176 causes transistor 184 to be forward biased, causing it to conduct and charge a capacitor 186 coupled to its collector electrode. Thus, a positive DC level is developed across capacitor 186, which applies through a resistor 189 and a coil 190 an artificial bias at input line 108 of the AFC stage 62. The artificial positive DC bias on line 108 causes the AFC stage 62 to lower the AFC output voltage on line 130 and hence line 78 to approximately + 2 volts DC. The resulting output causes UHF RF oscillator 34 to change in frequency in order to lower the video carrier frequency.

A resistor 200 is coupled between the collector of transistor 184 and the base of transistor 166 in the AFC buffer 69 in order to provide positive feedback. When the signal across capacitor 186 causes the output of the AFC stage 62 to drop from + 10 to + 2 volts, the positive feedback provided through resistor 200 maintains transistor 166 in its forward bias state, thereby maintaining a logical 1 bit on line 70 even though the AFC level on line 78 soon drops below that otherwise sufficient to maintain transistor 166 in conduction. Thus, only the return of horizontal sync pulses will now be effective to disable the extended range AFC circuit.

As soon as the IF video carrier is pulled within + 1 megahertz of 45.75 megahertz, sync pulses will again be detected by the sync separator 46 of FIG. 1. As a result, sync detector 64 receives negative going sync pulses on line 142, causing transistor 154 to again be driven on. The voltage on line 65 now drops to approximately ground potential, i.e., a 0 bit, so that diode 170 is no longer reversed biased. The diode 170 will therefore conduct, lowering the potential at the base of transistor 176 and turning it off, which in turn reverse biases transistor 184. The artificial bias across capacitor 186 is now dissipated across a shunting resistor 194, terminating the artificial bias and thus terminating the extended range capability of the AFC system.

At this time, the normal AFC circuitry takes over. Since the video carrier is located within the bandpass of the AFC stage 62 and associated transformers, line 108 continues to have a more positive voltage than line 109, which at this time is due not to the artificial bias from AFC driver 76, but rather to the presence of the video carrier V.C. as detected in the discriminator. AFC stage 62 therefore continues to have a relatively more negative AFC voltage on line 78 until the UHF oscillator 34 pulls in the video carrier to the desired 45.75 megahertz frequency.

In FIG. 4, the operation of logic circuit 72 is illustrated. The logic circuit is only effective when the video carrier V.C. in FIG. 3 is at a point D which can be located anywhere within the dashed line bandpass. For example, if the video carrier V.C. is at any of the points A, B or C in FIG. 3, the pair of inputs to diodes 170 and 172 is such that transistor 176 is not gated into its conducting state. Only at point D (which may be any point within a range from 46.75 to 48.75 megahertz) are the binary outputs from both the sync detector and the AFC buffer proper to turn on the transistor 176, as represented by logical 1 bit.

Both the absence of sync pulses and the presence of the sound carrier as detected by a + 10 volt AFC level are necessary to properly activate the extended range portion of the AFC system. For example, if AFC buffer 69 and diode 172 were eliminated, permitting transistor 176 to turn on whenever horizontal sync was lost, transistor 176 would be biased on whenever the receiver happened to be tuned to a blank channel. The AFC voltage on line 78 would thus be pulled down to about + 2.5 volts DC. If the receiver was next switched to a channel which was detuned or tracked − 3.0 megahertz into "smear," the following would occur. The IF video carrier, located at 42.75 megahertz for a + 6.0 V. AFC voltage, would now be forced further into "smear" and out of the wide band AFC pull-in range due to the AFC voltage being forced to + 2.5 volts due to the loss of sync. The incorporation of a between channel AFC defeat switch would eliminate this problem on channel changes, but the problem would still exist if a station went off the air momentarily, or if the receiver was already on a desired UHF channel prior to the receiver being turned on by a viewer.

The AFC voltage on line 130 tends to rise above + 6.5 volts due to noise when the receiver is tuned to a blank channel. When the AFC output voltage increases to a point that exceeds by + 0.6 volts the emitter bias of transistor 176, it is turned on and turns on transistor 184, forcing the AFC voltage to drop. Transistors 176 and 184 are then turned off after a short delay, thus permitting the AFC voltage to rise again. As a result, the AFC voltage will hunt above and below the + 6.5 reference level when the receiver is tuned to a blank channel with AFC turned on, preventing any lockout condition.

AFC buffer 69 is also useful to defeat the logic circuit when AFC is turned off by a manual AFC swtich (not illustrated) and sync is lost due to the viewer tuning the video carrier into the region of the 47.25 megahertz trap. If the logic circuit was not defeated, the receiver would begin to hunt, thus the viewer would not be in control of fine tuning for his receiver. The emitter bias at transistor 176 is set so that the logic gate is off if AFC is at + 6 volts, and on when the AFC voltage is about + 7 volts if there is no sync present.

Four requirements are necessary for the proper operation of the logic circuit 72. The first is that the AFC stage passband must be extended downwardly to include 42.25 megahertz. This allows the sound carrier S.C. to generate an AFC output voltage which triggers the logic for + 1.0 megahertz or greater tuning errors. Next, the AFC voltage applied to transistor 176 must be delayed to allow the desired video IF carrier to be picked up by the AFC stage 62 and to allow horizontal sync pulses to be detected by sync detector 64. If transistor 176 were turned off before the AFC stage 62 could lock onto the desired IF video carrier, the circuit would go into an undesirable hunting condition.

Thirdly, the peak amplitude of the 45.75 megahertz signal (horizontal sync tips) at the input of the AFC stage 62 should be a minimum of 16 DB above limiting sensitivity with the video detector level set at its operating point. This to insure that the AFC hold-in range is unaffected by amplitude modulation of the video IF carrier. Finally, the AFC takeoff point should come after the 41.25 megahertz trap for the co-channel sound carrier. This prevents the AFC input from being blocked by the sound carrier should the overall RF response from the antenna to the mixer be tilted with the sound carrier greater than 6 DB above the video carrier.

The logic circuitry to extend the AFC pull-in range can be added to conventional AFC stages provided the lower frequency bandpass can be extended far enough so that when the video IF carrier is above the pull-in range, the IF sound carrier will have moved within the bandpass to produce an AFC output voltage. Thus, the circuitry of AFC stage 62 can be replaced by other conventional AFC circuits which meet or can be modified to meet these requirements. Other changes and modifications will be apparent to those skilled in the art.

Having described the invention, the embodiments of the invention in which an exclusive property or privilege is claimed are defined as follows:

1. In a television receiver having tunable means for converting a composite television signal including first and second modulated carriers and sync components into an intermediate frequency signal, an automatic frequency control system operative to respond to frequency deviations in the intermediate frequency signal comprising:

correction means responsive to frequency deviations of the first IF carrier from a fixed intermediate frequency and operative for retuning said tunable means to correct for said frequency deviations, said correction means being ineffective for frequency deviations of said first IF carrier outside of a predetermined pull-in range, carrier indicator means coupled to said correction means for providing a positive indication signal when only said second IF carrier appears within a first portion of said pull-in range;

sync detector means for detecting the absence of sync components, thereby indicating the absence of said first IF carrier from said pull-in range; and extended range means coupled to said sync detector means and said carrier indicator means for extending the pull-in range of said correction means in response to both the detected absence of said first carrier and the detected presence of said second carrier within said first portion of said pull-in range.

2. The automatic frequency control system of claim 1 wherein said first modulated carrier comprises a video modulated carrier and said second modulated carrier comprises an audio modulated carrier spaced from said video modulated carrier by a fixed frequency separation, said correction means being responsive to return said video carrier to the desired fixed intermediate frequency.

3. The automatic frequency control system of claim 2 wherein said correction means has a pull-in range extending from a first frequency located in one direction from the desired intermediate frequency of said video carrier to a second frequency located in an opposite direction from said desired intermediate frequency of said video carrier, said first portion of said pull-in range for said carrier detector means extending from said desired intermediate frequency for said video carrier in one of said opposite directions, and said extended range means is responsive to extend the pull-in range of said correction means in the other of said opposite directions.

4. The automatic frequency control system of claim 1 wherein said correction means produces a correction signal of variable level dependent upon the extent of frequency deviation, said tunable means being responsive to the level of said correction signal for varying the frequency of said intermediate frequency signal, and said carrier indicator means is responsive to a predetermined level of said correction signal to thereby indicate the presence of said one carrier.

5. The automatic frequency control system of claim 4 wherein the variable level of said correction signal extends in positive and negative directions with respect to a reference level which represents no frequency deviation for the intermediate frequency signal, said extended range means being responsive to said correction signal when it has one of said positive or negative directions, and supplemental bias means responsive to said extended range means for changing said correction signal to the opposite positive or negative direction in order to pull in the intermediate frequency signal from the opposite direction to that produced by the operation of the correction means without said supplemental bias means.

6. The automatic frequency control system of claim 1 wherein said sync detector means includes time constant means for producing a control signal in response to the absence of said sync pulses for a predetermined period of time, said extended range means being responsive to said control signal and the detected presence of said one carrier within said first portion of said pull-in range to extend the pull-in range of said correction means.

7. The automatic frequency control system of claim 6 wherein said sync detector means includes noise gate means for rendering said sync detector means inoperative except during the time period of a gating pulse, said receiver includes scan means for generating a periodic gating pulse which occurs in synchronism with said sync components, and means for coupling said periodic gate signal from said scanning means to said noise gate means.

8. In a television receiver for a composite television signal including a video modulated carrier, an audio modulated carrier and sync components, tuning means for deriving an intermediate frequency signal having an IF video carrier and an IF audio carrier desirably located at a fixed video intermediate frequency and a fixed audio intermediate frequency respectively, an automatic frequency control system comprising:

correction means for developing a correction signal of a first characteristic when said IF video carrier deviates in one direction from said fixed video intermediate frequency and of a second characteristic when said IF video carrier deviates in an opposite direction from said fixed video intermediate frequency, the bandwidth of said correction means extending from a first frequency offset in said one direction to a second frequency offset in said opposite direction from said fixed video intermediate frequency, said tuning means being responsive to said first characteristic to move said IF video carrier in said opposite direction and to said second characteristic to move said IF video carrier in said one direction, sync detector means for detecting the absence of said sync components, supplemental correction means actuable to cause said correction signal to assume said second characteristic, and detection means for actuating the supplemental correction means in response to both the detected absence of said sync components and the IF video carrier being located outside said bandwidth and between said second frequency and a third frequency offset therefrom in said opposite direction.

9. The automatic frequency control system of claim 8 in which said receiver includes scanning means for generating retrace pulses which occur in synchronism with said sync component, said sync detector means includes time constant means for indicating the absence of sync components only after the absence of a predetermined plurality of said sync components, and noise gate means for rendering said time constant means inoperative except during the time period of said retrace pulses.

10. The automatic frequency control system of claim 8 wherein said detection means includes logic means for detecting when said IF audio carrier is located between said first frequency and said fixed video intermediate frequency in order to actuate said supplemental correction means.

11. The automatic frequency control system of claim 10 wherein said logic means has an input coupled to said correction means and responsive when said correction signal has said first characteristic for thereby indicating the presence of said IF audio carrier between said first frequency and said fixed video intermediate frequency.

12. The automatic frequency control system of claim 11 wherein said supplemental correction means includes feedback means coupled to said input for maintaining a signal having said first characteristic at said input when said supplemental correction means causes said correction signal to assume said second characteristic.

* * * * *